E. ERIK.
GROUND GRIPPER DETACHABLE TREAD.
APPLICATION FILED JULY 26, 1920.
1,398,893.
Patented Nov. 29, 1921.
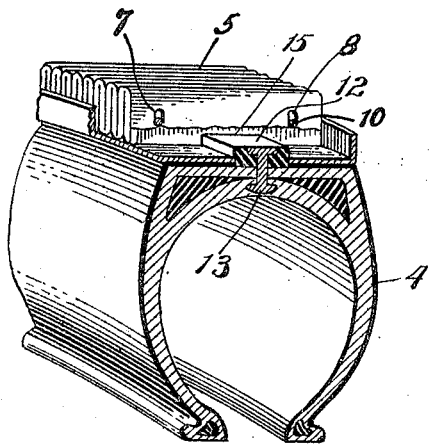
Inventor
Emil Erik
By his Attorney
Arthur Middleton

UNITED STATES PATENT OFFICE.

EMIL ERIK, OF OSSINING, NEW YORK, ASSIGNOR, BY DIRECT AND MESNE ASSIGNMENTS, OF TWO-TENTHS TO ELROY I. QUICK, OF OSSINING, NEW YORK, AND THREE-TENTHS TO ALDEN W. HARVEY, OF NEW YORK, N. Y.

GROUND-GRIPPER DETACHABLE TREAD.

1,398,893.  Specification of Letters Patent.  Patented Nov. 29, 1921.

Application filed July 26, 1920. Serial No. 398,850.

*To all whom it may concern:*

Be it known that I, EMIL ERIK, a citizen of the United States, residing at Ossining, New York, have invented new and useful Improvements in Ground-Gripper Detachable Treads, of which the following is a specification.

My invention relates to tires for motor vehicles and more particularly to that type of tire in which a renewable tread portion is provided.

The object of my invention is to provide a tire of this general type in which the tread will have greater wear resisting qualities without detracting from the resiliency of the tire, will afford positive traction under the most exacting condition, and will be practically puncture-proof, and at the same time can be manufactured at a reasonable cost.

In the drawings:

The figure is a section of a pneumatic tire showing one embodiment of my invention.

In the preferred form of my invention I provide a tread which may be attached to a tire casing especially designed to carry it. My improved tread comprises an annular channel preferably of cloth and rubber, having relatively narrow flat surfaces or flanges near its outer edges. The channel is adapted to be secured in any suitable manner to a tire casing 4 which is adapted to receive it. As a wearing surface I provide a continuous strip of closely woven heavy fabric (high pressure water hose), pressed very close together and folded as at 5 so that the load is carried on the ends of the threads of which the fabric is made. In the folds I provide a plurality of oblong openings 7, 8 through which wires 10, preferably of galvanized steel are passed. After the fabric has been folded it is treated with a water-proofing solution. The folded fabric 5 is placed in the channel and the ends of the wires 10 joined as by welding so as to form continuous hoops running circumferentially of the tire and, not only holding the fabric wearing surface in position, but in the channel as well. The wires 10 are preferably welded together before the tread is placed on the shoe, which placing on the shoe is done when the shoe is completely deflated. After the complete tread has been placed on the shoe and the shoe fully inflated, the tread is held firmly in place. The oblong conformation of the openings 7, 8 allows limited movement to the wires 10 without injury to the fabric and also allows proper resiliency.

It will be readily seen that by having the ends of the threads form the wearing surface the durability of my tire is very greatly in excess of the ordinary fabric tire now in use. Furthermore, the tractive qualities of cloth over wet or icy surfaces is well known.

When the fabric 5 becomes sufficiently worn it is only necessary to cut the wires 10, remove the old fabric and insert a fresh one in its place in the manner described. The casing 4 is also provided on its flat outer surface with a centrally disposed rib 12 which is interrupted at intervals around the casing and may be reinforced by rivets 13. The lower edge of the fabric 5 is also recessed as at 15 to engage the rib 12 to prevent lateral movement. The interrupted rib 12 allows insertion of tools for removing the tread.

What I claim is:

In combination, a tire carcass having a circumferential channel, a removable tread within said channel comprising a strip of flattened annular fabric, folded back and forth upon itself, the folds of which are disposed laterally in relation to the tire carcass, said tread being secured to said carcass by means of circumferential tie wires penetrating each fold of the tread, and an interrupted circumferential rib arranged centrally of said channel secured to said carcass by means of rivets, that portion of the tread member coming in contact with said interrupted rib having cut away portions adapted to receive the rib.

In testimony whereof, EMIL ERIK has signed his name to this specification in the presence of a subscribing witness, this 2nd day of April, 1920.

EMIL ERIK.

Witness:
ALDEN W. HARVEY.